United States Patent
You et al.

(10) Patent No.: US 10,733,634 B2
(45) Date of Patent: Aug. 4, 2020

(54) OPTIMIZING ONLINE ADVERTISING CAMPAIGN ALLOCATIONS

(71) Applicant: Microsoft Technology Licensing, LLC, Redmond, WA (US)

(72) Inventors: Siyu You, Santa Clara, CA (US); Romer Rosales-Delmoral, Burlingame, CA (US)

(73) Assignee: Microsoft Technology Licensing, LLC, Redmond, WA (US)

(*) Notice: Subject to any disclaimer, the term of this patent is extended or adjusted under 35 U.S.C. 154(b) by 1346 days.

(21) Appl. No.: 14/578,219

(22) Filed: Dec. 19, 2014

(65) Prior Publication Data

US 2016/0063574 A1 Mar. 3, 2016

Related U.S. Application Data

(60) Provisional application No. 62/044,174, filed on Aug. 29, 2014.

(51) Int. Cl.
G06Q 30/02 (2012.01)
(52) U.S. Cl.
CPC ......... *G06Q 30/0275* (2013.01); *G06Q 30/02* (2013.01)
(58) Field of Classification Search
None
See application file for complete search history.

(56) References Cited

U.S. PATENT DOCUMENTS

| 8,719,089 B1* | 5/2014 | Kent | G06Q 30/08 705/14.4 |
| 2009/0313120 A1* | 12/2009 | Ketchum | G06Q 30/02 705/14.51 |
| 2010/0100422 A1* | 4/2010 | Schwarz | G06Q 30/02 705/7.35 |
| 2014/0304063 A1* | 10/2014 | English | G06Q 30/0243 705/14.42 |

OTHER PUBLICATIONS

"Arbitrage: Advertising Policies Help", ©2014 Google, [Online]. Retrieved from the Internet: <URL: https://supportgoogle.com/adwordspolicy/answer/190442?hl=en>, (Accessed Aug. 18, 2014), 7 pgs.

"Form", [Online]. [Online]. Retrieved from the Internet: <URL: http://bounceexchange.com/bounce/iframe_campaign/10582?mode=0&website_id=64 . . . , (Accessed Aug. 18, 2014), 1 pg.

(Continued)

*Primary Examiner* — Alexandru Cirnu
(74) *Attorney, Agent, or Firm* — Schwegman Lundberg & Woessner, P.A.

(57) ABSTRACT

A method of optimizing online advertising campaign allocations is disclosed. It is determined that an auction for a set of advertising slots has been triggered. It is identified that the advertising campaigns are configured to bid on the set of advertising slots. A ranking score for each of the advertising campaigns is determined. The ranking scores are adjusted for each cost-per-click advertising campaign of the set of advertising campaigns by an adjustment factor specific to a context of the auction. The set of advertising slots is allocated to the winners of the auction. The winners of the auction are communicated for integration into a content page.

20 Claims, 5 Drawing Sheets

(56) References Cited

OTHER PUBLICATIONS

"LinkedIn Ads Campaign Pricing—Overview", [Online]. Retrieved from the Internet: <URL: http://help.linkedin.com/app/answers/detail/a_id/7431/~/linkedin-ads-campaign-pricing>, (Apr. 11, 2014), 2 pgs.
"Online advertising", Wikipedia, the free encyclopedia, [Online]. Retrieved from the Internet: <URL: http://en.wikipedia.org/wiki/Online_advertising>, (Aug. 18, 2014), 10 pgs.
"Quantitative Modeling for Arbitrage Positions in Ad KeyWords Internet Marketing", [Online]. Retrieved from the Internet: <URL: http://decisionstats.com/2012/01/12/quantitative-modeling-for-arbitrage-positions-in-ad-keywords-internet-marketing/>, (Accessed Aug. 18, 2014), 3 pgs.
"What Is TITAS™?", [Online]. Retrieved from the Internet: <URL: http://titasadexchange.com/own-an-ad-exchange>, (Accessed Aug. 18, 2014), 4 pgs.
Barnes, John, "Why media owners are losing out on potential digital ad revenues", [Online]. Retrieved from the Internet: <URL: http://www.theguardian.com/media/media-blog/2013/mar/05/media-owners-digital-ad-revenues>, (Mar. 5, 2013), 3 pgs.
Edwards, Jim, "Facebook Has Banned Ad Price "Arbitrage"", Business Insider, [Online]. Retrieved from the Internet: <URL: http://finance.yahoo.com/news/facebook-banned-ad-price-arbitrage-120400521.html>, (Jul. 10, 2013), 5 pgs.
Edwards, Jim, "GroupM's Rob Norman Hits Back on Ad Price "Arbitrage"", [Online]. Retrieved from the Internet: <URL: http://www.businessinsider.com/groupms-rob-norman-hits-back-on-ad-price-arbitrage- . . . , (Mar. 18, 2013), 1 pgs.
Gevirtz, Harrison, "Running an Ad Network (The Mechanics of Arbitrage)", [Online]. Retrieved from the Internet: <URL: http://www.shoemoney.com/2008/09/19/running-an-ad-network-the-mechanics-of-arbitrage>, (Sep. 19, 2008), 23 pgs.
Hines, Kristi, "The Getting Started Guide to LinkedIn Advertising: Unbounce", [Online]. Retrieved from the Internet: <URL: http://unbounce.com/social-media/guide-to-linkedin-advertising/>, (Jul. 4, 2013), 9 pgs.
Johnston, Michael, "CPC Arbitrage: What It Is and How to Pull It off: MonetizePros", [Online]. Retrieved from the Internet: <URL: http://monetizepros.com/blog/2014/cpc-arbitrage-what-it-is-and-how-to-pull-it-off/>, (Apr. 15, 2014), 9 pgs.
Keller, Chris R, "Cost Per Click vs Cost Per Impression—Which One Is Better?", Profitworks, [Online]. Retrieved from the Internet: <URL: http://www.profitworks.ca/blog/243-Cost-Per-Click-vs-Cost-Per-Impression-google-ad . . . >, (Accessed Aug. 18, 2014), 4 pgs.
Mott, Elizabeth, "PPC Vs. CPM on LinkedIn", [Online]. [Online]. Retrieved from the Internet: <URL: http://yourbusiness.azcentral.com/ppc-vs-cpm-linkedin-13933.html>, (Accessed Aug. 18, 2014), 3 pgs.
Picard, Eric, "How Arbitrage Works in Advertising Today—iMediaConnection.com/", [Online]. Retrieved from the Internet: <URL: http://www.imediaconnection.com/content/34532.asp>, (Jul. 11, 2013), 4 pgs.
Pilney, Roger, "LinkedIn Ads: CPC or CPM? How to Choose a Social Ad Cost Structure", Dell—Social Business Connection, [Online]. Retrieved from the Internet: <URL: http://en.community.dell.com/dell-groups/sbc/b/weblog/archive/2013/01/22/linkedin-a . . . >, (Jan. 22, 2013), 1 pg.
Younger, Myles, "Is your CPC campaign just a big gift to your retargeting platform?", [Online]. Retrieved from the Internet: <URL: http://www.exactdrive.com/news/is-your-cpc-campaign-just-a-big-gift-to-your-retargeting-platform>, (Apr. 3, 2014), 5 pgs.

* cited by examiner

OPTIMIZING ONLINE ADVERTISING CAMPAIGN ALLOCATIONS

CROSS-REFERENCE TO RELATED APPLICATIONS

The present application claims the benefit of priority to U.S. Provisional Patent Application Ser. No. 62/044,174, filed Aug. 29, 2014, which is incorporated herein by reference in its entirety.

TECHNICAL FIELD

The present disclosure generally relates to the technical field of online advertising and, in one embodiment, to optimizing revenues from online advertising auctions without violating predetermined constraints pertaining to allocations of different type of advertising campaigns.

BACKGROUND

A publisher of online content (e.g., a social network system) may provide advertisers with the ability to integrate advertisements with the online content. For example, the publisher may allow the advertiser to create an advertising campaign. An advertising campaign may include an advertisement and one or more advertisement variations, each of which may include one or more of a headline, description, or image. Additionally, the advertisement may be associated with a link (e.g., a URL) to a web page. Thus, when a member of the social networking service clicks on the advertisement, the member may be directed to the web page. An advertising campaign may also be associated with a desired audience (e.g., based on demographic or other information known about members of the social network system) and information about how the advertiser agrees to compensate the publisher to promote the advertisement.

An advertiser may choose to compensate the publisher using one or more of a variety of methods, such as the cost-per-mille (CPM) method or the cost-per-click (CPC) method. With the CPM method, advertisers may pay for every thousand impressions of the advertisement. Although the precise definition of an impression may vary between publishers, an impression is generally considered to be a display of the advertisement to a potential customer. With the CPC method, advertisers may pay each time a member clicks on the advertisement.

Additionally the campaign may be associated with a bid amount. The bid amount may indicate a maximum amount the advertiser is willing to pay when a member clicks on the advertisement (for CPC advertising campaigns) or a maximum amount the advertiser is willing to pay for every 1,000 impressions of the advertisement (for CPM advertising campaigns). When a member requests access to a content page served by the publishing system of the publisher, a real-time auction for each advertising slot on the content page may be triggered. The advertising campaign that wins the auction (e.g., based on its bid) may have an advertisement allocated for the advertising slot. Then, when the content page is served to the member, the advertisement is displayed in the advertising slot to the member.

DESCRIPTION OF THE DRAWINGS

Some embodiments are illustrated by way of example and not limitation in the FIG.s of the accompanying drawings, in which.

DETAILED DESCRIPTION

Figure 1:
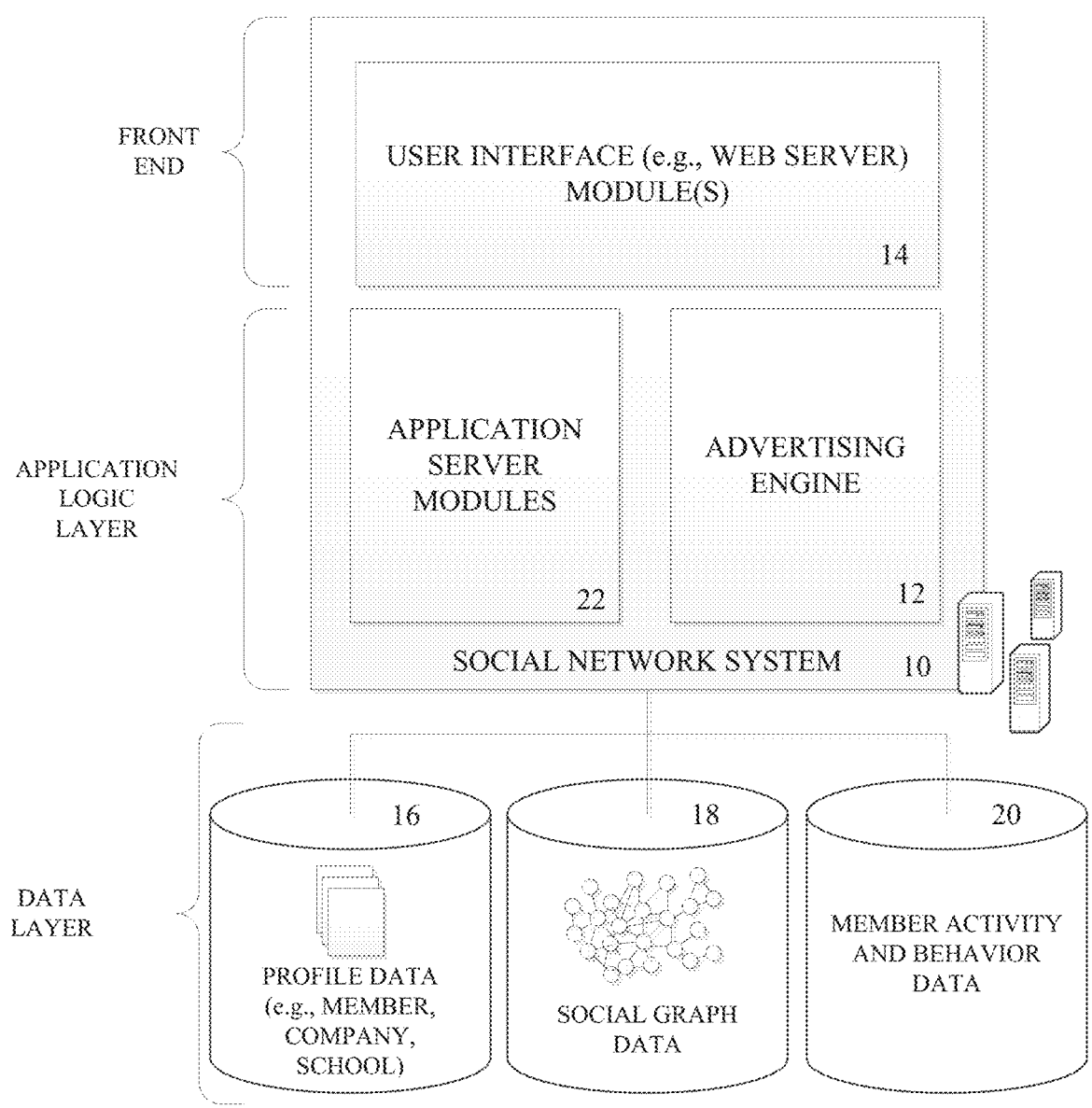
FIG. 1 is a block diagram of the functional modules or components that comprise a computer-network based social network service, including an advertising engine consistent with some embodiments of the invention.

The present disclosure describes methods, systems and computer program products for maximizing revenues collected from real-time auctions of online advertising slots without violating predetermined constraints pertaining to allocations of the slots to particular types of advertising campaigns. In the following description, for purposes of explanation, numerous specific details are set forth in order to provide a thorough understanding of the various aspects of different embodiments of the present invention. It will be evident, however, to one skilled in the art, that the present invention may be practiced without all of the specific details and/or with variations permutations and combinations of the various features and elements described herein.

A social network service, such as LinkedIn, may publish various content pages, such as news feeds customized for members of the social network. Each of the content pages may have one or more advertising slots. When the member requests access to the content page, advertisements may be allocated to the advertising slots based on the results of a real-time auction. Then, when the content page is served to the member, the advertisements allocated to the advertising slots may be presented to the member.

In various embodiments, content pages may have multiple advertising slots that may be allocated in real-time auctions to any combination of types of advertising campaigns, including CPC advertising campaigns and CPM advertising campaigns. For CPM advertising campaigns, the amount of the bid is a fixed amount. However, for CPC advertising campaigns, the amount of the bid is based on a probability that the member of the social-networking system to which the advertisement is displayed will click on the advertisement. The probability that the member will click the advertisement may vary based on various factors, including an advertising channel over which the advertisement is presented. Examples of such advertising channels may include a desktop PC channel, a tablet PC channel, or a mobile device channel. Thus, in various embodiments, a CPC advertising campaign may win more auctions on one channel than on another.

A goal of an operator of the publishing system may be to maximize revenues that the operator will be able to collect from advertisers based on the results of the real-time auctions conducted for such advertising slots. However, for various reasons, the operator may choose to balance this goal of maximizing revenues with other interests, such as ensuring advertisers are satisfied with the allocations their advertisements receive and limiting online arbitrage opportunities that may arise across different advertising channels, including desktop, tablet, and mobile device channels. Thus, for example, the operator may choose to establish global constraints pertaining to types of advertising campaigns that are selected as winners of auctions with respect to each advertising channel. An example of such a constraint may be that no more than 90% of advertising slots on the desktop advertising channel are to be allocated to CPC advertising campaigns. Thus, in various embodiments, any disparity between numbers of impressions of different types of advertising campaigns across advertising channels may be reduced.

In various embodiments, a method of maximizing advertising revenue associated with an auction for advertising slots without violating a constraint with respect to allocation of the advertising slots to different types of advertising campaigns is disclosed. A set of data items pertaining to a set of past advertising auctions is obtained. The set of data items includes, for each of the set of past advertising auctions, information pertaining to the member who accessed a content page including the advertising slots, information pertaining to which advertisement associated with the advertising campaign was selected, and information pertaining to a context under which the advertisement was presented. The information pertaining to the context includes the channel over which the advertisement was presented, the day and time at which the advertisement was presented, and a geographical location of where the advertisement was presented.

For each auction of the set of past advertising auctions, a ranking adjustment factor is selected for application to each of the CPC advertisements that placed a bid on the auction. The ranking adjustment factor is an experimental value that is specific to the context of each auction, including the information pertaining to the channel, time, and location of the auction. An amount of adjusted revenue that would have been generated if the ranking adjustment factors had been applied to each auction is determined. New ranking adjustment factors for each context are selected and the process is repeated until both (1) a probability that the set of ranking adjustment factors for each context that would've yielded the most revenue is an optimal set transgresses an optimization threshold (e.g., through application of the Nelder-Mead method) and (2) the constraint with respect to the allocation of the advertising slots to different types of advertising campaigns is satisfied.

The determined optimal set of ranking adjustment factors for CPC advertisement campaigns of each context may then be accessed and applied during real-time auction of advertising slots.

For example, suppose four advertising campaigns (CPC1, CPM1, CPC2, and CPM2) place bids on an auction for two advertising slots associated with a specific context, including channel, time, and location. Without any adjustment factors being applied, it is determined that the winners of the auction would be the CPC1 and CPM1 advertisement campaigns. However, when the optimal adjustment factor for the context (as identified above) is applied, it is determined that the winners of the auction are the CPM1 and CPM2 advertising campaigns.

In various embodiments, a method of optimizing online advertising campaign allocations is disclosed. It is determined that an auction for a set of advertising slots has been triggered. It is identified that the advertising campaigns are configured to bid on the set of advertising slots. A ranking score for each of the advertising campaigns is determined. The ranking scores are adjusted for each cost-per-click advertising campaign of the set of advertising campaigns by an adjustment factor specific to a context of the auction. The set of advertising slots is allocated to the winners of the auction. The winners of the auction are communicated for integration into a content page.

Other advantages and aspects of the present inventive subject matter will be apparent from the description of the figures that follows.

FIG. 1 is a block diagram of the functional modules or components that comprise a computer- or network-based social network service 10, including an advertising engine 12 consistent with some embodiments of the invention. As shown in FIG. 1, the social network system 10 is generally based on a three-tiered architecture, comprising a front-end layer, application logic layer, and data layer. As is understood by skilled artisans in the relevant computer and Internet-related arts, each module or engine shown in FIG. 1 represents a set of executable software instructions and the corresponding hardware (e.g., memory and processor) for executing the instructions. To avoid obscuring the inventive subject matter with unnecessary detail, various functional modules and engines that are not germane to conveying an understanding of the inventive subject matter have been omitted from FIG. 1. However, a skilled artisan will readily recognize that various additional functional modules and engines may be used with a social network system, such as that illustrated in FIG. 1, to facilitate additional functionality that is not specifically described herein. Furthermore, the various functional modules and engines depicted in FIG. 1 may reside on a single server computer, or may be distributed across several server computers in various arrangements. Moreover, although depicted in FIG. 1 as a three-tiered architecture, the inventive subject matter is by no means limited to such architecture.

As shown in FIG. 1, the front end consists of a user interface module (e.g., a web server) 14, which receives requests from various client-computing devices, and communicates appropriate responses to the requesting client devices. For example, the user interface module(s) 14 may receive requests in the form of Hypertext Transport Protocol (HTTP) requests, or other web-based, application programming interface (API) requests. The client devices (not shown) may be executing conventional web browser applications, or applications that have been developed for a specific platform to include any of a wide variety of mobile devices and operating systems.

As shown in FIG. 1, the data layer includes several databases, including one or more databases 16 for storing data relating to various entities represented in a social graph. With some embodiments, these entities include members, companies, and/or educational institutions, among possible others. Consistent with some embodiments, when a person initially registers to become a member of the social network service, and at various times subsequent to initially registering, the person will be prompted to provide some personal information, such as his or her name, age (e.g., birth date), gender, interests, contact information, home town, address, the names of the member's spouse and/or family members, educational background (e.g., schools, majors, etc.), current job title, job description, industry, employment history, skills, professional organizations, and so on. This information is stored as part of a member's member profile, for example, in the database with reference number 16. With some embodiments, a member's profile data will include not only the explicitly provided data, but also any number of derived or computed member profile attributes and/or characteristics.

Once registered, a member may invite other members, or be invited by other members, to connect via the social network service. A "connection" may require a bi-lateral agreement by the members, such that both members acknowledge the establishment of the connection. Similarly, with some embodiments, a member may elect to "follow" another member. In contrast to establishing a "connection", the concept of "following" another member typically is a unilateral operation, and at least with some embodiments, does not require acknowledgement or approval by the member that is being followed. When one member follows another, the member who is following may receive automatic notifications about various activities undertaken by the member being followed. In addition to following another member, a user may elect to follow a company, a topic, a conversation, or some other entity. In general, the associations and relationships that a member has with other members and other entities (e.g., companies, schools, etc.) become part of the social graph data maintained in a database 18. With some embodiments a social graph data structure may be implemented with a graph database 18, which is a particular type of database that uses graph structures with nodes, edges, and properties to represent and store data. In this case, the social graph data stored in database 18 reflects the various entities that are part of the social graph, as well as how those entities are related with one another.

With various alternative embodiments, any number of other entities might be included in the social graph, and as such, various other databases may be used to store data corresponding with other entities. For example, although not shown in FIG. 1, consistent with some embodiments, the system may include additional databases for storing information relating to a wide variety of entities, such as information concerning various online or offline groups, job listings or postings, photographs, audio or video files, and so forth.

With some embodiments, the social network service may include one or more activity and/or event tracking modules, which generally detect various user-related activities and/or events, and then store information relating to those activities/events in the database with reference number 20. For example, the tracking modules may identify when a user makes a change to some attribute of his or her member profile, or adds a new attribute. Additionally, a tracking module may detect the interactions that a member has with different types of content. Such information may be used, for example, by one or more recommendation engines to tailor the content presented to a particular member, and generally to tailor the user experience for a particular member.

The application logic layer includes various application server modules 22, which, in conjunction with the user interface module(s) 14, generates various user interfaces (e.g., web pages) with data retrieved from various data sources in the data layer. With some embodiments, individual application server modules 22 are used to implement the functionality associated with various applications, services and features of the social network service. For instance, a messaging application, such as an email application, an instant messaging application, or some hybrid or variation of the two, may be implemented with one or more application server modules 22. Of course, other applications or services may be separately embodied in their own application server modules 22.

The social network service may provide a broad range of applications and services that allow members the opportunity to share and receive information, often customized to the interests of the member. For example, with some embodiments, the social network service may include a photo sharing application that allows members to upload and share photos with other members. As such, at least with some embodiments, a photograph may be a property or entity included within a social graph. With some embodiments, members of a social network service may be able to self-organize into groups, or interest groups, organized around a subject matter or topic of interest. Accordingly, the data for a group may be stored in a database (not shown). When a member joins a group, his or her membership in the group will be reflected in the social graph data stored in the database with reference number 18. With some embodiments, members may subscribe to or join groups affiliated with one or more companies. For instance, with some embodiments, members of the social network service may indicate an affiliation with a company at which they are employed, such that news and events pertaining to the company are automatically communicated to the members. With some embodiments, members may be allowed to subscribe to receive information concerning companies other than the company with which they are employed. Here again, membership in a group, a subscription or following relationship with a company or group, as well as an employment relationship with a company, are all examples of the different types of relationships that may exist between different entities, as defined by the social graph and modeled with the social graph data of the database with reference number 18.

In addition to the various application server modules 22, the application logic layer includes an advertising engine 12. As illustrated in FIG. 1, with some embodiments the advertising engine 12 is implemented as a service that operates in conjunction with various application server modules 22. For instance, any number of individual application server modules 22 can invoke the functionality of the advertising engine 12. However, with various alternative embodiments, the advertising engine 12 may be implemented as its own application server module such that it operates as a stand-alone application. With some embodiments, the advertising engine 12 may include or have an associated publicly available application programming interface (API) that enables third-party applications to invoke the functionality of the search engine 12.

Figure 2:
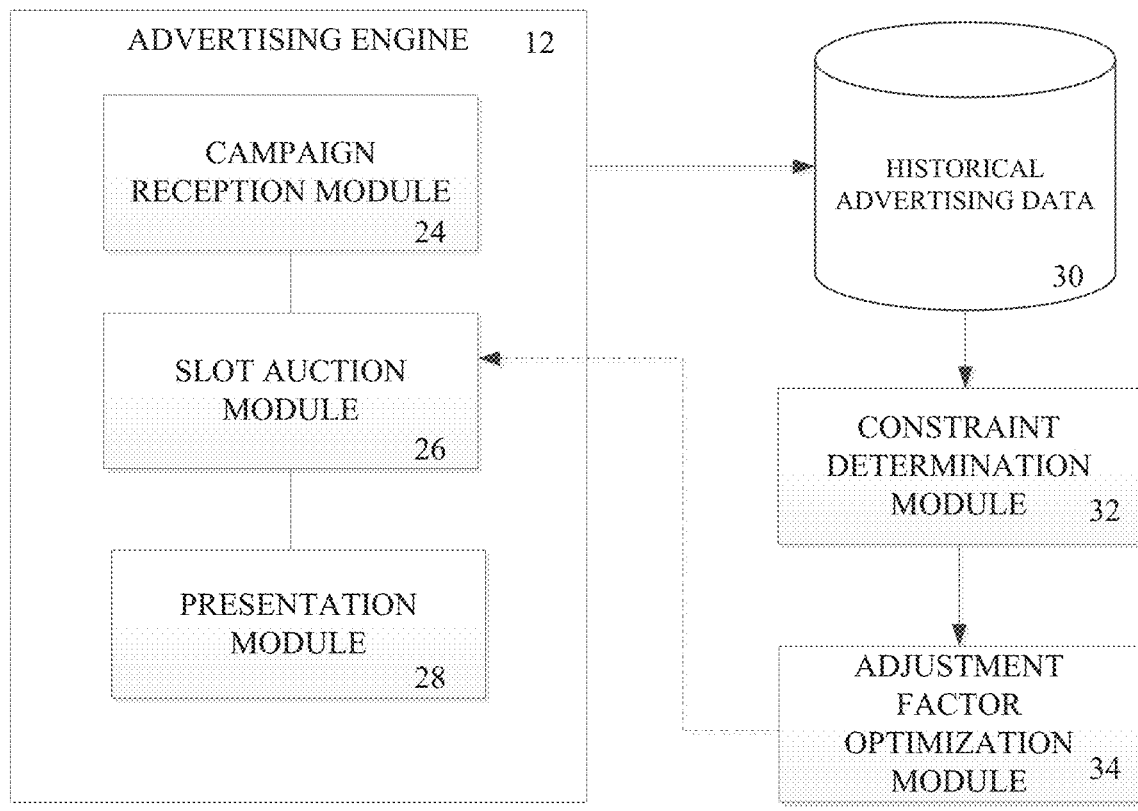
FIG. 2 is a functional block diagram of the advertising engine of FIG. 1 and associated modules.

FIG. 2 is a functional block diagram depicting the advertising engine of FIG. 1 and associated modules. A campaign reception module 24 is configured to receive advertising campaigns (e.g., from advertisers) that are to be targeted to members of the social network system. Each of the advertising campaigns may include an advertisement and one or more advertisement variations. Each advertisement and variation may include information about a subject of the advertisement, including one or more of a headline, description, or image. Additionally, the advertisement may be associated with a link (e.g., a URL) to a content page (e.g., a web page) such that, when a member clicks on the advertisement, the member may be directed to the content page. An advertising campaign may also be associated with a desired audience. The desired audience may be identified based on demographic or other information known about the members (e.g., as specified in their member profiles). An advertisement may also include information about how the advertiser agrees to compensate the publisher to promote the advertisement, such as whether the advertiser has agreed to a CPC or CPM compensation method for the adverting campaign.

A slot auction module 26 is configured to handle real-time auctions pertaining to advertising slots. For example, the slot auction module 26 determines that a member is requesting access to a content page, such as a news feed, that includes one or more advertising slots. The slot auction module 26 then determines advertising campaigns that are configured to place bids on the advertising slots (e.g., based on the member being one of the target members for the advertising campaign). The slot auction module 26 may determine a ranking score for each of the advertising campaigns based on a bid amount submitted for each advertising campaign. In various embodiments, the slot auction module 26 applies a predetermined adjustment factor to the ranking score of each CPC advertisement campaign that is configured to place bids. The predetermined adjustment factor may be determined based on a constraint specified by the operator of the social network system, such as a minimum number, minimum percentage, maximum number, or minimum percentage of advertising slots that are to be allocated to CPC advertisements or CPM advertisements with respect to a particular advertising channel.

A presentation module 28 is configured to integrate the advertisements to which the advertising slots of a content page have been allocated into a content page that is to be served to the member.

Historical advertising data 30 is collected over a period of time (e.g., 28 days). The advertising data includes information pertaining to a set of past advertising auctions that have been conducted. The set of data items may include, for each of the set of past advertising auctions, information pertaining to the member who accessed a content page including the advertising slots, information pertaining to which advertisement associated with the advertising campaign was selected, and information pertaining to a context under which the advertisement was presented. The information pertaining to the context includes the channel over which the advertisement was presented, the day and time at which the advertisement was presented, and a geographical location of where the advertisement was presented.

A constraint determination module 32 is configured to determine constraints that are to be considered with respect to determining allocation of advertising slots to particular types of advertising campaigns. For example, the constraint determination module 32 may receive a specification of predetermined constraints from an administrator of the social network system that set minimum or maximum percentages of advertising slots that are to be allocated to advertising campaigns of different types over each advertising channel. In various embodiments, the constraint determination module 32 may calculate the constraints automatically based on an analysis of ratios of a first type of advertising campaign to a second type of advertising campaign that have been selected as winners of auctions over each advertising channel. Thus, for example, the constraint determination module 32 may calculate constraints pertaining to the allocation of different types of advertisements to ensure that a particular type of advertisement is able to win an auction in a particular channel with at least a certain percentage of confidence.

An adjustment factor optimization module 34 is configured to determine and continually optimize adjustment factors for CPC campaigns of each possible context to both maximize revenues and satisfy the constraints, as described in more detail below. The adjustment factor optimization module 34 is configured to provide the optimized adjustment factors to the slot auction module 26 for use in ranking CPC advertising campaigns for purposes of allocating advertising slots.

Figure 3:
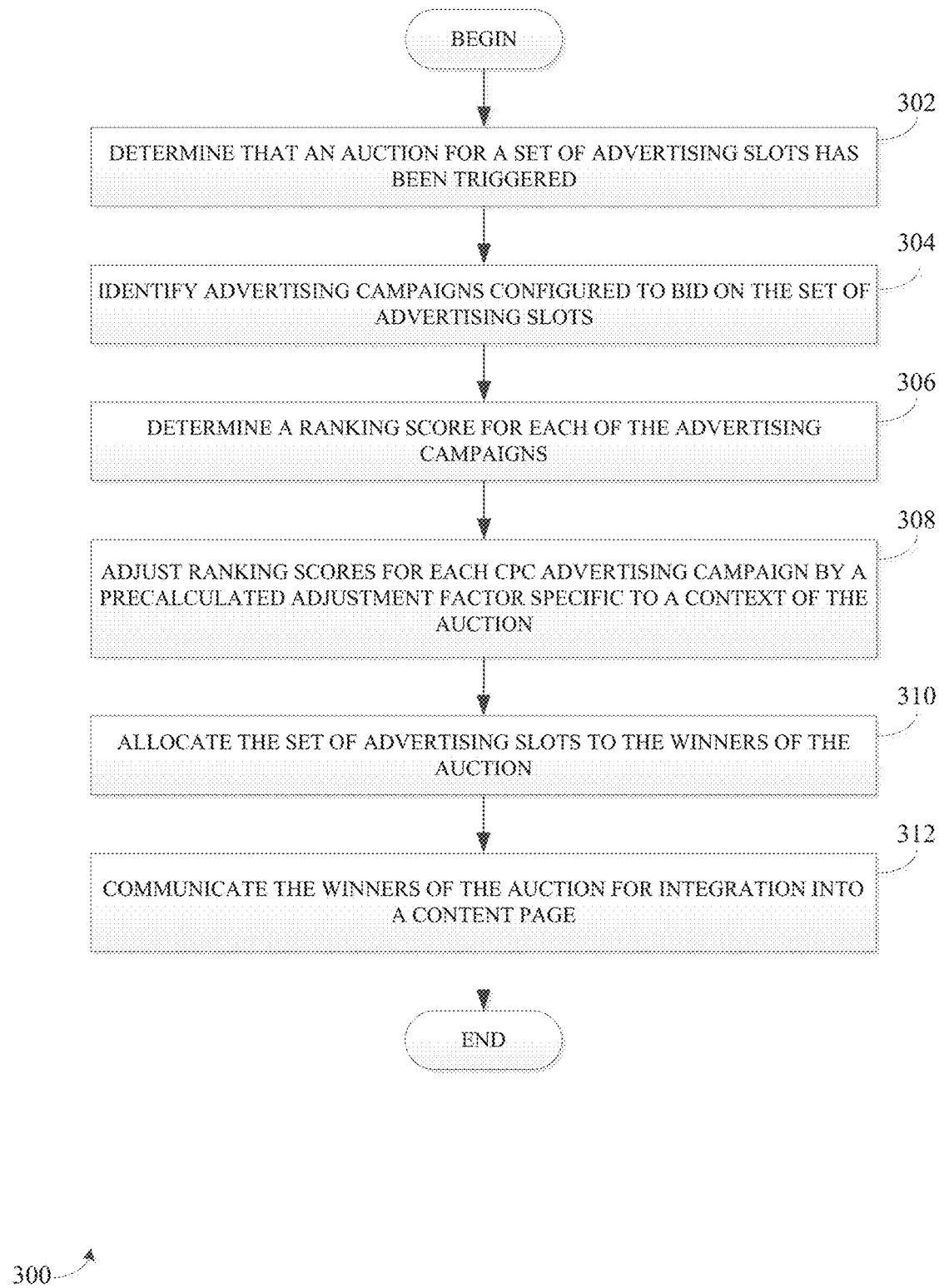
FIG. 3 is a flow diagram illustrating an example method of allocating advertising slots to advertising campaigns.

FIG. 3 is a flow diagram illustrating an example method 300 of allocating advertising slots to advertising campaigns. In various embodiments, the method 300 is implemented by one or more of the modules of FIG. 2. At operation 302, the slot auction module 26 determines that an auction for a set of advertising slots has been triggered. For example, the slot auction module 26 determines that a member has requested a content page of the social network system, such as a news feed, that is associated with the set of advertising slots.

At operation 304, the slot auction module 26 identifies advertising campaigns that are configured to bid on the set of advertising slots. For example, the slot auction module 26 identifies that information pertaining to the member who requested the content page matches information that the advertiser specified as the target audience for the advertising campaign.

At operation 306, the slot auction module 26 calculates ranking scores for each of the advertising campaigns configured to submit bids for the advertising slots. In various embodiments, the ranking score for CPM campaigns is simply a specified bid amount, whereas the ranking score for CPC advertising campaigns is a specified bid amount times the probability that the member will click on the CPC advertisement. The probability may be calculated based on various criteria, including information pertaining to the member (e.g., a member click-through rate), information pertaining to the advertisement (e.g., an advertisement click-through rate), and information pertaining to the context under which the advertisement is to be presented. In various embodiments, the context includes the advertising channel (e.g., desktop, tablet, or mobile), the day and time, and the geographical location. Thus, for example, the context for a particular auction that is for an advertising slot that is to be presented on a tablet on Monday at 3 pm in California, may be represented as a tuple of values, such as ("Tablet", "Monday 3 PM", CA). In various embodiments, the day and time may be binned by hour in a week (e.g., 7×24).

At operation 308, the slot auction module 26 adjusts the ranking scores for each CPC advertising campaign configured to place a bid on the auction by a (pre-calculated adjustment factor specific to a context of the auction. This pre-calculated adjustment factor may represent an optimal adjustment factor specific to the context for maximizing advertising revenues and satisfying a constraint pertaining to allocations of advertising slots to different types of advertising campaigns over different advertising channels. The adjustment factor may be calculated as described below with respect to FIG. 4.

At operation 310, the slot auction module 26 allocates the set of advertising slots to the winners of the auction.

At operation 312, the presentation module 28 communicates advertisements corresponding to the winning advertising campaigns for integration into the content page that is to be displayed to the member.

Figure 4:
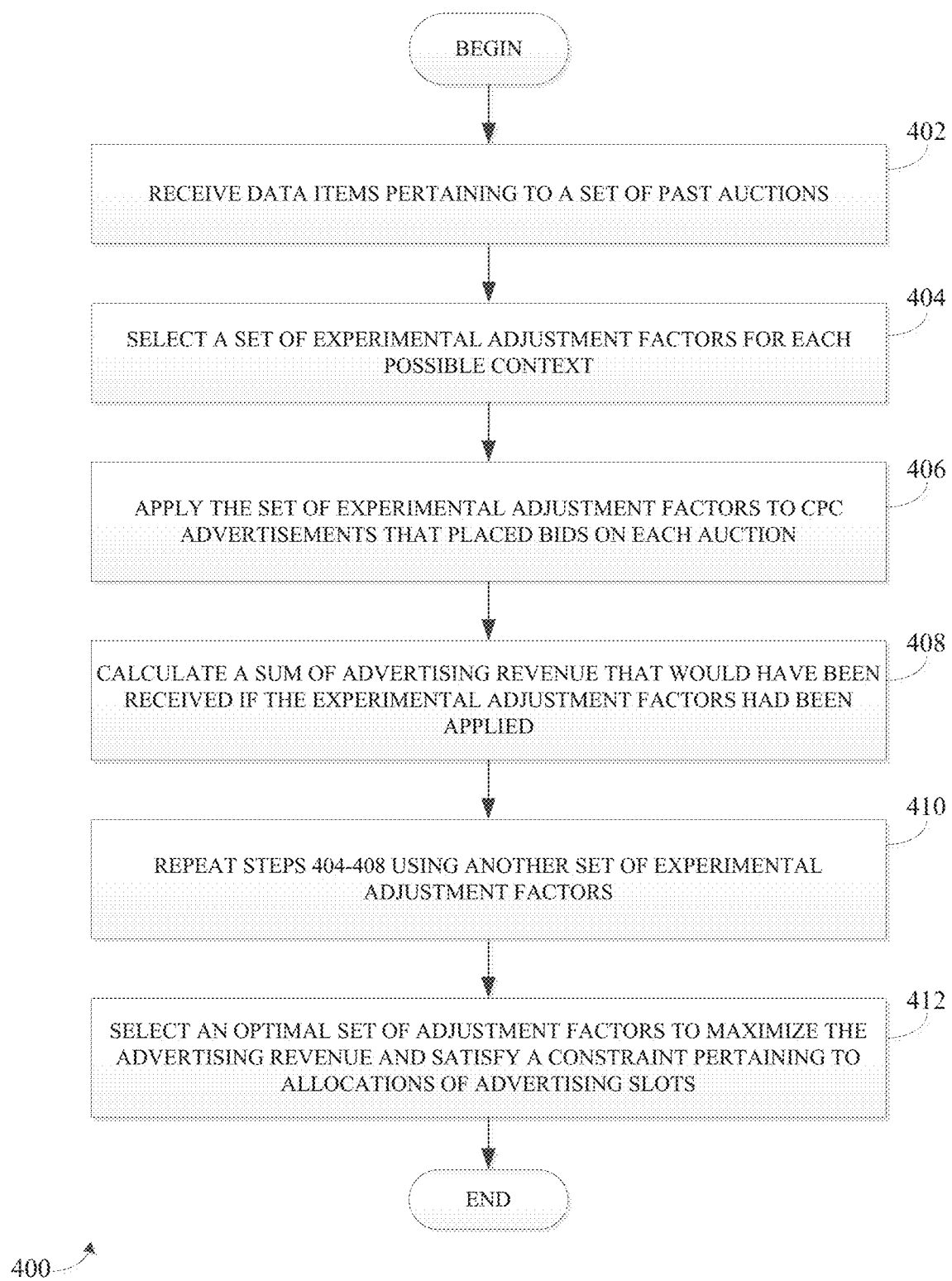
FIG. 4 is a flow diagram illustrating an example method of determining an optimal set of adjustment factors for each possible auction context for maximizing advertising revenues and satisfying constraints pertaining to allocation of advertising slots.

FIG. 4 is a flow diagram illustrating an example method 400 of determining an optimal set of adjustment factors for each possible auction context for maximizing advertising revenues and satisfying constraints pertaining to allocation of advertising slots. In various embodiments, the method 400 is implemented by one or more of the modules of FIG. 2. At operation 402, the adjustment factor optimization module 34 receives a set of data items pertaining to a set of past auctions. The set of data items may include, for each of the set of past advertising auctions, information pertaining to the member who accessed a content page including the advertising slots, information pertaining to which advertisement associated with the advertising campaign was selected, and information pertaining to a context under which the advertisement was presented. The information pertaining to the context may include information pertaining to the channel over which the advertisement was presented (desktop, tablet, or mobile), the day and time at which the advertisement was presented, and a geographical location of where the advertisement was presented.

At operation 404, the adjustment factor optimization module 34 selects a set of experimental adjustment factors for each possible context. In various embodiments, the set of experimental adjustment factors may be randomly seeded at first and then modified over multiple iterations (e.g., based on an application of the Nelder-Mead method to previous sets of experimental adjustment factors).

At operation 406, the adjustment factor optimization module 34 applies the set of experimental adjustment factors to CPC advertisements that placed bids on each auction in the set of past auctions. Thus, for a first auction having a first context, ranking scores for each CPC advertisement that placed a bid on the first auction are adjusted by the experimental adjustment factor of the set of experimental adjustment factors corresponding to the first context; for a second auction have a second context, ranking scores for each CPC advertisement that placed a bid on the second auction are adjusted by the experimental factor of the set of experimental factors corresponding to the second context; and so on. The result for each auction is a new calculation of the amount of advertising revenues that would have been collected if the set of experimental adjustment factors had been applied to the set of past auctions.

At operation 408, the adjustment factor optimization module 34 calculates the sum of the recalculated revenues of each auction of the set of past auctions.

At operation 410, the adjustment factor optimization module 34 repeats steps 404-408 using another set of experimental adjustment factors. (In various embodiments, the new set of experimental adjustment factors is selected based on an application of the Nelder-Mead method.)

At operation 412, the adjustment factor optimization module 34 selects a set of optimal adjustment factors based on a selected one of the sets of experimental adjustment factors that (1) maximizes advertising revenue and (2) satisfies a constraint pertaining to the allocations of advertising slots to different types of advertising campaigns over each advertising channel. This set of optimal adjustment factors may be communicated to the slot auction module 26 for use in adjusting the ranking scores of advertising campaigns during real-time auctions.

In various embodiments, the method 400 may be performed continuously in an offline manner over a set of historical advertising data that is received from the advertising engine. Thus, for example, the last 28 days of advertising data may be used as test data for calculating the set of optimal adjustment factors. Whenever the set of optimal adjustment factors is changed, the advertising engine 12 may be notified and provided with the new adjustment factors for use in adjusting ranking scores during real-time auctions.

In various embodiments, an optimal solution may be determined as follows. Let $(z)$ denote any combination of values corresponding to the context tuple (channel, time, geo). There may be a large number (e.g., ~10K to ~100K) unique values of $(z)$. The collection $(S=\{\alpha(z)\})$ for all $(z)$ is a solution to the optimization problem. In various embodiments, the solution is feasible only if it satisfies a constraint (e.g., a business rule) pertaining to allocations of advertising slots associated with each channel. Each solution is associated with an amount of revenue. A feasible solution with the maximum amount of revenue is to be determined. In various embodiments, given the high dimensional nature of the problem, the Nelder-Mead method or amoeba method may be used to solve this optimization problem. For example, the experimental adjustment factors for a particular training data set (e.g., a set of past auctions having particular contexts) may be considered test points from which optimal values for other contexts may be extrapolated.

In various embodiments, a particular set of data (e.g., 28 days of historical data) serves as the training data set. Revenue corresponding to any solution, say $(S^*)$, is calculated with respect to the training data set. Summing up all resulting revenue for each auction gives total revenue of the solution. By constantly iterating on a collection of solutions $(\{S\})$ and dropping ineligible solutions, an optimal solution $(S^{opt})$ may be identified. The adjustment factor $(\alpha(z))$ for all $(z's)$ in $(S^{opt})$ may be pushed to an online data access location, such as an online key-value store. The advertising engine 12 may then access the adjustment factor for any context $(\alpha(channel, time, geo))$ during real-time auctions.

The various operations of the example methods described herein may be performed, at least partially, by one or more processors that are temporarily configured (e.g., by software instructions) or permanently configured to perform the relevant operations. Whether temporarily or permanently configured, such processors may constitute processor-implemented modules or objects that operate to perform one or more operations or functions. The modules and objects referred to herein may, in some example embodiments, comprise processor-implemented modules and/or objects.

Similarly, the methods described herein may be at least partially processor-implemented. For example, at least some of the operations of a method may be performed by one or more processors or processor-implemented modules. The performance of certain operations may be distributed among the one or more processors, not only residing within a single machine or computer, but deployed across a number of machines or computers. In some example embodiments, the processor or processors may be located in a single location (e.g., within a home environment, an office environment or at a server farm), while in other embodiments the processors may be distributed across a number of locations.

The one or more processors may also operate to support performance of the relevant operations in a "cloud computing" environment or within the context of "software as a service" (SaaS). For example, at least some of the operations may be performed by a group of computers (as examples of machines including processors), these operations being accessible via a network (e.g., the Internet) and via one or more appropriate interfaces (e.g., Application Program Interfaces (APIs)).

Figure 5:
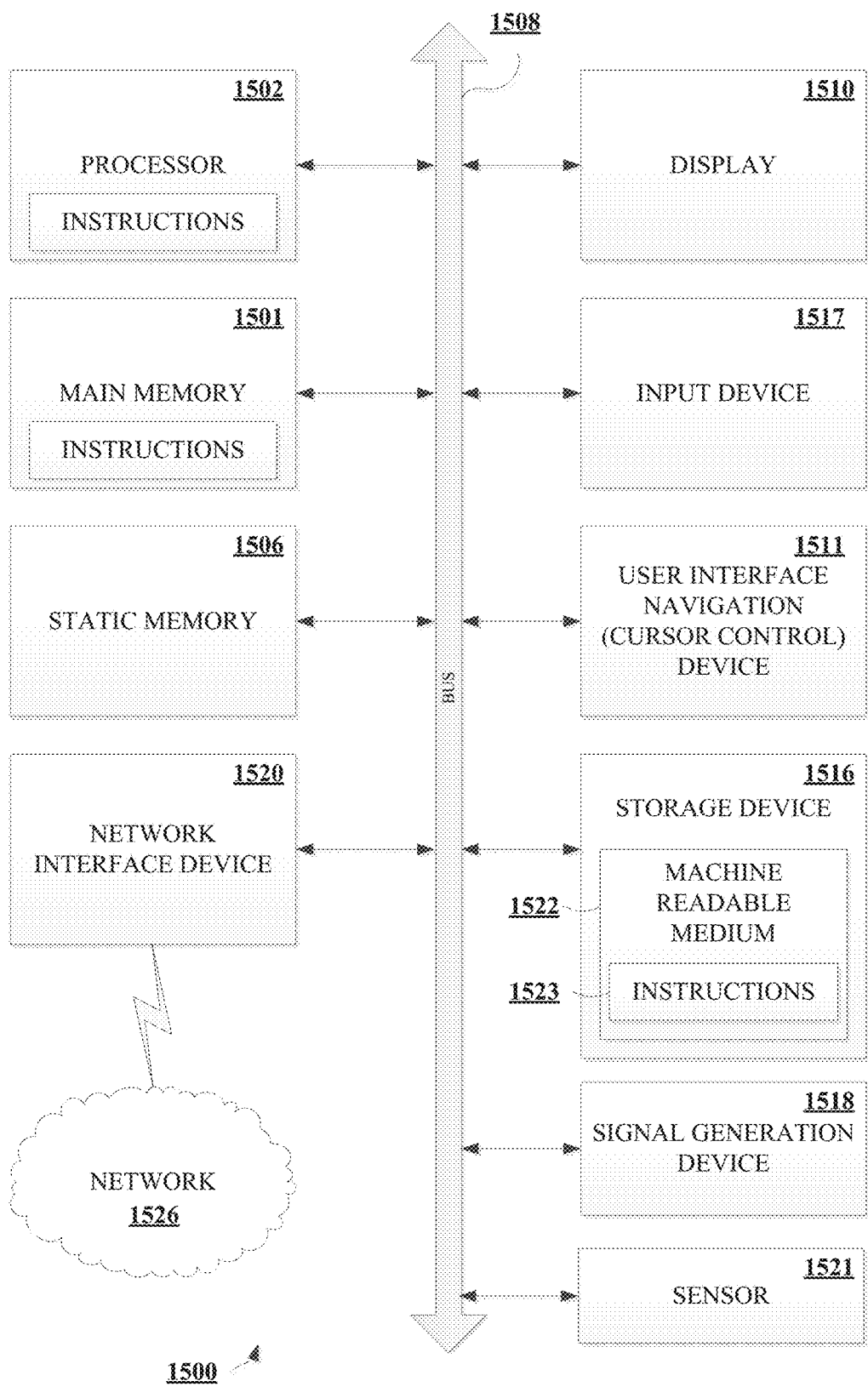
FIG. 5 is a block diagram of a machine in the form of a computing device within which a set of instructions, for causing the machine to perform any one or more of the methodologies discussed herein, may be executed.

FIG. 5 is a block diagram of a machine in the form of a computer system within which a set of instructions, for causing the machine to perform any one or more of the methodologies discussed herein, may be executed. In alternative embodiments, the machine operates as a standalone device or may be connected (e.g., networked) to other machines. In a networked deployment, the machine may operate in the capacity of a server or a client machine in a client-server network environment, or as a peer machine in peer-to-peer (or distributed) network environment. In a preferred embodiment, the machine will be a server computer, however, in alternative embodiments, the machine may be a personal computer (PC), a tablet PC, a set-top box (STB), a Personal Digital Assistant (PDA), a mobile telephone, a web appliance, a network router, switch or bridge, or any machine capable of executing instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1500 includes a processor 1502 (e.g., a central processing unit (CPU), a graphics processing unit (GPU) or both), a main memory 1501 and a static memory 1506, which communicate with each other via a bus 1508. The computer system 1500 may further include a display unit 1510, an alphanumeric input device 1517 (e.g., a keyboard), and a user interface (UI) navigation device 1511 (e.g., a mouse). In one embodiment, the display, input device and cursor control device are a touch screen display. The computer system 1500 may additionally include a storage device 1516 (e.g., drive unit), a signal generation device 1518 (e.g., a speaker), a network interface device 1520, and one or more sensors 1521, such as a global positioning system sensor, compass, accelerometer, or other sensor.

The drive unit 1516 includes a machine-readable medium 1522 on which is stored one or more sets of instructions and data structures (e.g., software 1523) embodying or utilized by any one or more of the methodologies or functions described herein. The software 1523 may also reside, completely or at least partially, within the main memory 1501 and/or within the processor 1502 during execution thereof by the computer system 1500, the main memory 1501 and the processor 1502 also constituting machine-readable media.

While the machine-readable medium 1522 is illustrated in an example embodiment to be a single medium, the term "machine-readable medium" may include a single medium or multiple media (e.g., a centralized or distributed database, and/or associated caches and servers) that store the one or more instructions. The term "machine-readable medium" shall also be taken to include any tangible medium that is capable of storing, encoding or carrying instructions for execution by the machine and that cause the machine to perform any one or more of the methodologies of the present invention, or that is capable of storing, encoding or carrying data structures utilized by or associated with such instructions. The term "machine-readable medium" shall accordingly be taken to include, but not be limited to, solid-state memories, and optical and magnetic media. Specific examples of machine-readable media include non-volatile memory, including by way of example semiconductor memory devices, e.g., EPROM, EEPROM, and flash memory devices; magnetic disks such as internal hard disks and removable disks; magneto-optical disks; and CD-ROM and DVD-ROM disks.

The software 1523 may further be transmitted or received over a communications network 1526 using a transmission medium via the network interface device 1520 utilizing any one of a number of well-known transfer protocols (e.g., HTTP). Examples of communication networks include a local area network ("LAN"), a wide area network ("WAN"), the Internet, mobile telephone networks, Plain Old Telephone (POTS) networks, and wireless data networks (e.g., Wi-Fi® and WiMax® networks). The term "transmission medium" shall be taken to include any intangible medium that is capable of storing, encoding or carrying instructions for execution by the machine, and includes digital or analog communications signals or other intangible medium to facilitate communication of such software.

Although embodiments have been described with reference to specific examples, it will be evident that various modifications and changes may be made to these embodiments without departing from the broader spirit and scope of the invention. Accordingly, the specification and drawings are to be regarded in an illustrative rather than a restrictive sense. The accompanying drawings that form a part hereof, show by way of illustration, and not of limitation, specific embodiments in which the subject matter may be practiced. The embodiments illustrated are described in sufficient detail to enable those skilled in the art to practice the teachings disclosed herein. Other embodiments may be utilized and derived therefrom, such that structural and logical substitutions and changes may be made without departing from the scope of this disclosure. This Detailed Description, therefore, is not to be taken in a limiting sense, and the scope of various embodiments is defined only by the appended claims, along with the full range of equivalents to which such claims are entitled.

What is claimed is:

1. A method comprising:
   incorporating one or more modules of an advertising engine into a social networking system, the one or more modules configuring one or more computer processors of the social networking system to perform operations for determining winners of an auction for a set of advertising slots on a content page in real-time between a receiving of a request from a member of the social networking system to access the content page and a serving of the content page to the member, the operations comprising;
   based on the receiving of the request, determining that the auction for the set of advertising slots has been triggered;
   identifying advertising campaigns configured to bid on the set of advertising slots;
   determining a ranking score for each of the advertising campaigns;
   adjusting ranking scores for one or more selected advertising campaigns of the identified advertising campaigns by an adjustment factor specific to a context of the auction, the adjustment factor based on a global constraint pertaining to the auction, the one or more selected advertising campaigns selected based on the one or more selected advertising campaigns being cost-per-click advertising campaigns, the global constraint specifying a cap on a total number of advertising slots that are to be allocated to the cost-per-click advertising campaigns in the specific context;
   selecting the winners of the auction based on the adjusted ranking scores;
   allocating the set of advertising slots to the winners of the auction; and
   communicating the winners of the auction for integration into the content page for the serving of the content page to the member.

2. The method of claim 1, wherein the context of the auction includes a time, channel, and location corresponding to the auction.

3. The method of claim 2, wherein the channel identifies a type of device on which the content page is to be presented.

4. The method of claim 3, wherein the type of the device is one of a desktop device, a tablet device, or a mobile device.

5. The method of claim 1, further comprising calculating the adjustment factor based on an analysis of data items pertaining to a set of past auctions with respect to a revenue objective.

6. The method of claim 5, wherein the analysis of the data items includes selecting a set of experimental adjustment factors from a plurality of sets of experimental adjustment factors used to calculate sums of advertising revenue that would have been received if each of the plurality of sets of experimental adjustment factors had been applied.

7. The method of claim 6, further comprising determining at least one of the plurality of the sets of experimental adjustment factors based on an application of an amoeba algorithm to a previously tested set of experimental adjustment factors.

8. A system comprising:
one or more computer processors;
one or more computer memories;
one or more modules of an advertising engine incorporated into the one or more computer memories, the one or more modules configuring the one or more processors to perform operations for determining winners of an auction for a set of advertising slots on a content page in real-time between a receiving of a request from a member of the social networking system to access the content page and a serving of the content page to the member, the operations comprising:
based on the receiving of the request, determining that the auction for the set of advertising slots has been triggered;
identifying advertising campaigns configured to bid on the set of advertising slots;
determining a ranking score for each of the advertising campaigns;
adjusting ranking scores for one or more selected advertising campaign of the identified advertising campaigns by an adjustment factor specific to a context of the auction, the adjustment factor based on a global constraint pertaining to the auction, the one or more selected advertising campaigns selected based on the one or more selected advertising campaigns being cost-per-click advertising campaigns, the global constraint specifying a cap on a total number of advertising slots that are to be allocated to the cost-per-click advertising campaigns in the specific context;
selecting the winners of the auction based on the adjusted ranking scores;
allocating the set of advertising slots to the winners of the auction; and
communicating the winners of the auction for integration into the content page for the serving of the content page to the member.

9. The system of claim 8, wherein the context of the auction includes a time, channel, and location corresponding to the auction.

10. The system of claim 9, wherein the channel identifies a type of device on which the content page is to be presented.

11. The system of claim 10, wherein the type of the device is one of a desktop device, a tablet device, or a mobile device.

12. The system of claim 8, the one or more modules further configured to calculate the adjustment factor based on an analysis of data items pertaining to a set of past auctions with respect to a revenue objective.

13. The system of claim 12, wherein the analysis of the data items includes selecting a set of experimental adjustment factors from a plurality of sets of experimental adjustment factors used to calculate sums of advertising revenue that would have been received if each of the plurality of sets of experimental adjustment factors had been applied.

14. The system of claim 13, the one or more modules further configured to determine at least one of the plurality of the sets of experimental adjustment factors based on an application of an amoeba algorithm to a previously tested set of experimental adjustment factors.

15. A non-transitory machine readable medium comprising a set of instructions that, when executed by one or more computer processors, causes the one or more computer processors to perform operations for determining winners of an auction for a set of advertising slots on a content page in real-time between a receiving of a request from a member of the social networking system to access the content page and a serving of the content page to the member, the operations comprising:
determining that an auction for a set of advertising slots has been triggered;
identifying advertising campaigns configured to bid on the set of advertising slots;
determining a ranking score for each of the advertising campaigns;
adjusting ranking scores for one or more selected advertising campaign of the identified advertising campaigns by an adjustment factor specific to a context of the auction, the adjustment factor based on a global constraint pertaining to the auction, the one or more selected advertising campaigns selected based on the one or more selected advertising campaigns being cost-per-click advertising campaigns, the global constraint specifying a cap on a total number of advertising slots that are to be allocated to the cost-per-click advertising campaigns in the specific context;
selecting the winners of the auction based on the adjusted ranking scores;
allocating the set of advertising slots to the winners of the auction; and
communicating the winners of the auction for integration into the content page for the serving of the content page to the member.

16. The non-transitory machine readable medium of claim 15, wherein the context of the auction includes a time, channel, and location corresponding to the auction.

17. The non-transitory machine readable medium of claim 16, wherein the channel identifies a type of device on which the content page is to be presented.

18. The non-transitory machine readable medium of claim 17, wherein the type of the device is one of a desktop device, a tablet device, or a mobile device.

19. The non-transitory machine readable medium of claim 15, further comprising calculating the adjustment factor based on an analysis of data items pertaining to a set of past auctions with respect to a revenue objective.

20. The non-transitory machine readable medium of claim 19, wherein the analysis of the data items includes selecting a set of experimental adjustment factors from a plurality of sets of experimental adjustment factors used to calculate sums of advertising revenue that would have been received if each of the plurality of sets of experimental adjustment factors had been applied.

* * * * *

UNITED STATES PATENT AND TRADEMARK OFFICE
CERTIFICATE OF CORRECTION

PATENT NO. : 10,733,634 B2  
APPLICATION NO. : 14/578219  
DATED : August 4, 2020  
INVENTOR(S) : You et al.

Page 1 of 1

It is certified that error appears in the above-identified patent and that said Letters Patent is hereby corrected as shown below:

In the Claims

In Column 12, Line 37, in Claim 1, delete "comprising;" and insert --comprising:-- therefor Signed and Sealed this
Nineteenth Day of October, 2021

Drew Hirshfeld
*Performing the Functions and Duties of the*
*Under Secretary of Commerce for Intellectual Property and*
*Director of the United States Patent and Trademark Office*